US008251573B2

(12) United States Patent
Chou

(10) Patent No.: US 8,251,573 B2
(45) Date of Patent: Aug. 28, 2012

(54) CUTTING TOOL FOR JUICER WITH MULTIPLE BLADE AND GEARING ARRANGEMENT

(75) Inventor: Wenhung Chou, Shenzhen (CN)

(73) Assignee: Airlux Electrical Co., Ltd., Shenzhen (CN)

( * ) Notice: Subject to any disclaimer, the term of this patent is extended or adjusted under 35 U.S.C. 154(b) by 624 days.

(21) Appl. No.: 12/420,990

(22) Filed: Apr. 9, 2009

(65) Prior Publication Data

US 2009/0193982 A1 Aug. 6, 2009

Related U.S. Application Data

(63) Continuation of application No. PCT/CN2007/000191, filed on Jan. 18, 2007.

(30) Foreign Application Priority Data

Aug. 3, 2006 (CN) ...................... 2006 2 0017367 U

(51) Int. Cl.
*A47J 43/08* (2006.01)
(52) U.S. Cl. ..................................... 366/205; 241/282.1
(58) Field of Classification Search .......... 366/197–207, 366/314, 274; 241/282.1–282.2, 199.12; 99/348, 510
See application file for complete search history.

(56) References Cited

U.S. PATENT DOCUMENTS

| 3,679,184 | A | * | 7/1972 | Woodham et al. | ............. 366/219 |
| 4,256,407 | A | * | 3/1981 | Seiderman | .................... 366/300 |
| 4,836,826 | A | * | 6/1989 | Carter | ............................. 464/29 |
| 5,645,346 | A | * | 7/1997 | Thuna | ........................... 366/205 |
| 5,860,736 | A | * | 1/1999 | Brisard | ........................... 366/94 |
| 6,012,837 | A | * | 1/2000 | Thuma | ........................... 366/294 |
| 6,027,242 | A | * | 2/2000 | Thuma | ........................... 366/205 |
| 6,981,795 | B2 | * | 1/2006 | Nikkah | ......................... 366/199 |
| 2009/0193982 | A1 | * | 8/2009 | Chou | ............................. 99/510 |

FOREIGN PATENT DOCUMENTS

| CN | 2376247 Y | 5/2000 |
| CN | 2460367 Y | 11/2001 |
| CN | 2486289 Y | 4/2002 |
| CN | 2787112 Y | 6/2006 |
| EP | 1 639 928 A1 | 3/2006 |
| WO | 2011/057459 A1 * | 5/2011 |

OTHER PUBLICATIONS

International Search Report of PCT/CN2007/000191, dated May 17, 2007.

* cited by examiner

*Primary Examiner* — Charles E Cooley
(74) *Attorney, Agent, or Firm* — Hamre, Schumann Mueller & Larson, P.C.

(57) ABSTRACT

A cutting tool for juicer includes a seat of axis, on which mounted a main blade axis, a main tool and an assistant blade axis for driving an assistant tool. The main blade axis drives the assistant blade axis to rotate via a gear A and a gear B of a gearing arrangement. The assistant blade axis drives the assistant tool to rotate. The revolving direction of the assistant tool is vis-à-vis with respect to that of the main tool, and the speed of the assistant tool is different from that of the main tool. A gear C is provided at the top of the assistant blade axis. An assistant blade pan of having inner teeth that extend inward is sheathed on the top of the main blade axis. The assistant tool is mounted on an outboard surface of the assistant blade pan. The gear C engages with the inner teeth of the assistant blade pan.

8 Claims, 7 Drawing Sheets

CUTTING TOOL FOR JUICER WITH MULTIPLE BLADE AND GEARING ARRANGEMENT

TECHNICAL FIELD

The present invention relates to an accessory of a juicer and, more particularly to a cutting tool with vis-à-vis differential speed used for a juicer.

BACKGROUND

The existing cutting tool for juicer is usually provided with a structure of one-layer or multi-layer cutter mounted on a main axis driven by a motor. The cutter will rotate with a high speed to cut fruit in juice. More description of the cutting tool can refer to Chinese Patents Issue No. 2486289 and No. 2640367.

Chinese Patent Issue No. 2486289 discloses a cutting tool consisting of an upper-layer blade mechanism, a low-layer blade mechanism overlapped and installed under the upper-layer blade mechanism and an axis of rotation providing overlapped fixation for the upper-layer and low-layer mechanisms. The axis of rotation is driven by a motor of the juicer to impart spin cutting function to the entire cutting tool. The blades on both sides of the upper-layer blade mechanism extend somewhat outward and have flat straight steepy cutting edges. The blades leave no food unstirred within the height of the cutting edge. Tops of blades on both sides have inwardly bent repelling wings and thus form a surrendering separate space which can inwardly gather food while stirring. This can prevent the smashed food from fleeing hither and thither thereby achieving effectively rapidly stirring.

Chinese Patent Issue No. 2640367 discloses a cutting tool of a juicer. The juicer sets a cup on its seat. The bottom axis of the cup is provided with a cutter connected with a motor disposed inside the seat. The cutting tool has a shape of three blades with six slices, including an upper blade, a middle blade and a low blade. The middle blade is in a flat shape with its continuously arc edge. The upper blade has at both sides upward arc bending and an inward inclined shape from the back of the upper blade to its edge. The low blade has at both sides upward arc bending and an outward inclined shape from the back of the blade to its edge.

In the cutting tools for juicers disclosed in the above two Patents, the first one uses a two-layer blade mechanism while the second one uses a three-layer blade mechanism. Regardless of two-layer or three-layer blade mechanism, the blades are all installed on a common axis of rotation. The juicers using the cutting tools cut fruit into comminjute and smash into juice by high-speed rotation of the blades in the juicer cups. Because fruit is cut in the juicer cups using the high-speed rotating blades and thereby run fast along with the blades during cutting, fruit will be heated due to intense friction with the walls of the juicer cups. Thus, quality of juice will be affected, especially, Vitamin C will be damaged. In addition, the juice may smell oxidated and taste slightly terrible.

SUMMARY OF THE INVENTION

The technology problem to be solved in the present invention is to overcome the above defects and provide a low-speed cutting tool for juicer, which has two-layer blades rotating with vis-à-vis differential speed.

A solution to the above problem is to provide a cutting tool for a juicer with two layers of blades. One layer is a main tool and the other layer is assistant tool. The layer of main tool and the layer of assistant tool are arranged in an upper-lower position. Further, both the main tool and the assistant tool rotate vis-à-vis with their respective different speed. The speed of the assistant tool is far lower than that of the main tool.

The cutting tool for a juicer disclosed in the present invention includes an axis base on which mounted a main blade axis, a main tool and an assistant blade axis for driving the assistant tool. The main tool is mounted on the top of the main blade axis. The main blade axis drives the assistant blade axis to rotate through a gearing means. The assistant blade axis rotates the assistant tool. The main tool and the assistant tool rotate with vis-à-vis differential speed.

As an improvement of the present invention, the above gearing means can be designed as follows: a gear A is provided at an underside of the main blade axis, and a gear B is provided at an underside of the assistant blade axis. The gear A and the gear B engage with each other.

As another improvement of the present invention, the above gearing means can be designed as follows: a driving gear A is provided at an underside of the main blade axis. A magnet A is inlaid at an outer edge of the driving gear A. A driving gear B is provided at an underside of the assistant blade axis. A magnet B with an inverse polarity relative to the magnet A is inlaid at an outer edge of the driving gear B. The driving gear A drives the driving gear B to rotate vis-à-vis through magnetic force.

As still another improvement of the present invention, the above gearing means can also be designed as follows: a driving gear A is provided at an underside of the main blade axis. A rubber layer A is coated on an outer edge of the driving gear A. A driving gear B is provided at an underside of the assistant blade axis. A rubber layer B is coated on an outer edge of the driving gear B. The rubber layer A contacts the rubber layer B.

A gear C is provided at the top of the assistant blade axis. An assistant blade pan having inner teeth that extend inward is sheathed on the top of the main blade axis. The assistant tool is mounted on an outboard surface of the assistant blade pan. The gear C engages with the inner teeth of the assistant blade pan.

The main blade is a round sheet with a hole. At least three blades extend outward from an outer circumference of the round sheet. The blades bend upward with certain angles α with respect to an extended plane of the sheet.

The angles between the blades and the extended plane of the sheet vary in different blades.

At least one side of each blade has saw teeth.

The assistant tool is in a long arc shape.

The main tool is arranged on an upper layer while the assistant tool is arranged under the main tool. The assistant tool runs slower than the main tool.

In the present invention, the assistant blade axis are applied to the axis seat, for driving the assistant tool. The main blade axis rotates the assistant blade axis through the gearing means. The assistant blade axis drives the assistant tool. Further, the main tool and the assistant tool rotate with a vis-à-vis differential speed, thus greatly reducing rotary speed of the assistant tool. The juice obtained by cutting using this structure tastes sweet due to low temperature, freshness and little damage on Vitamin C.

Figure 1:
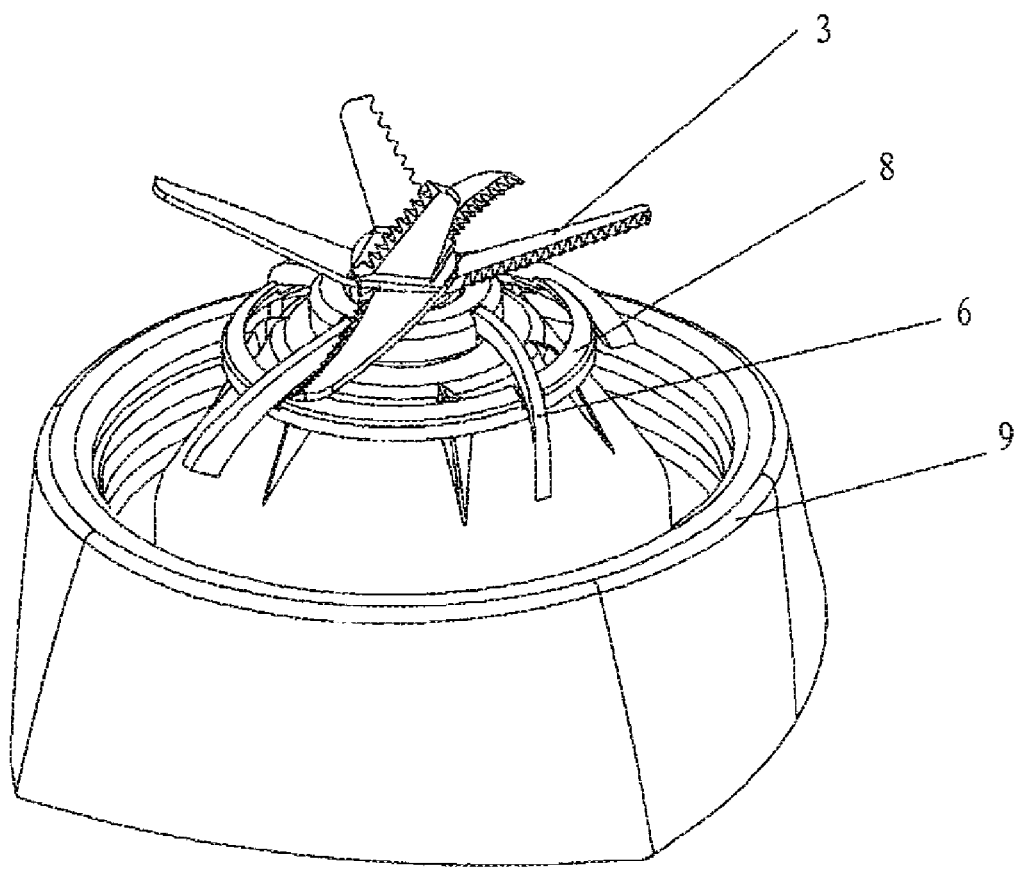
FIG. 1 is an isometric view of a structure of an embodiment of the present invention.
Figure 2:
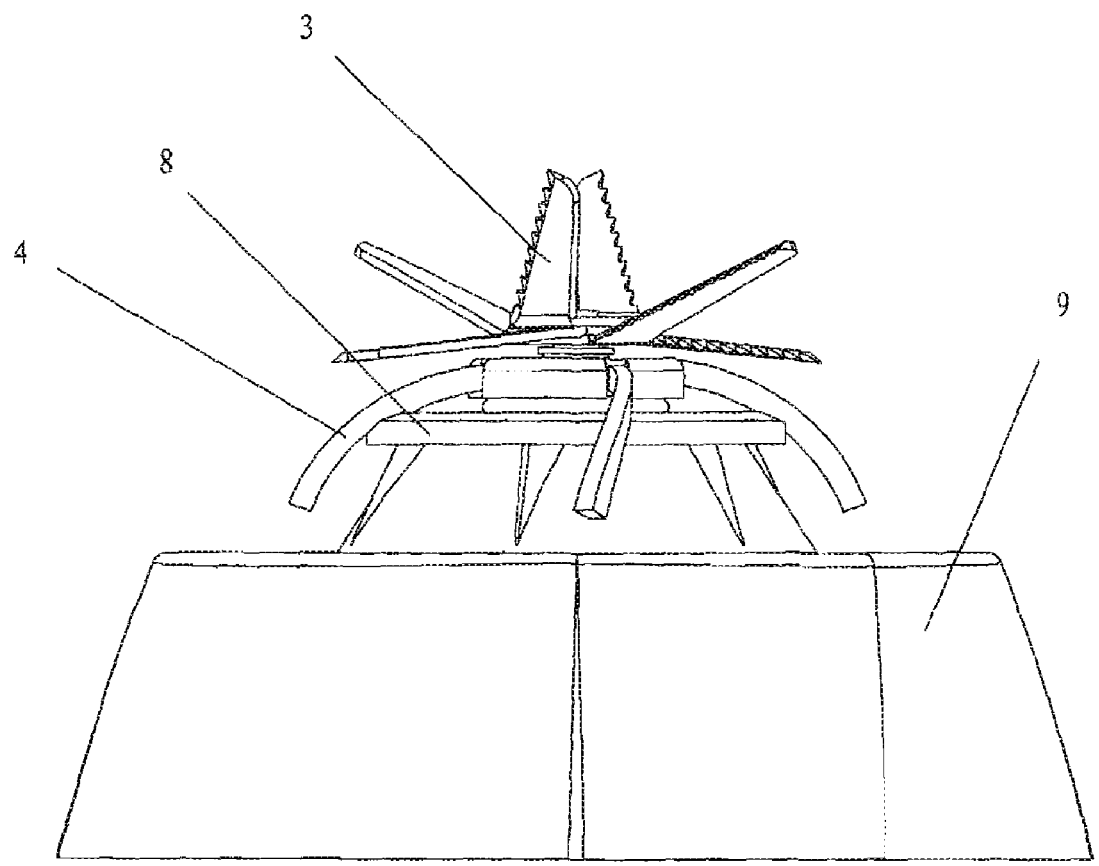
FIG. 2 is a schematic, front view of the structure in FIG. 1.
Figure 3:
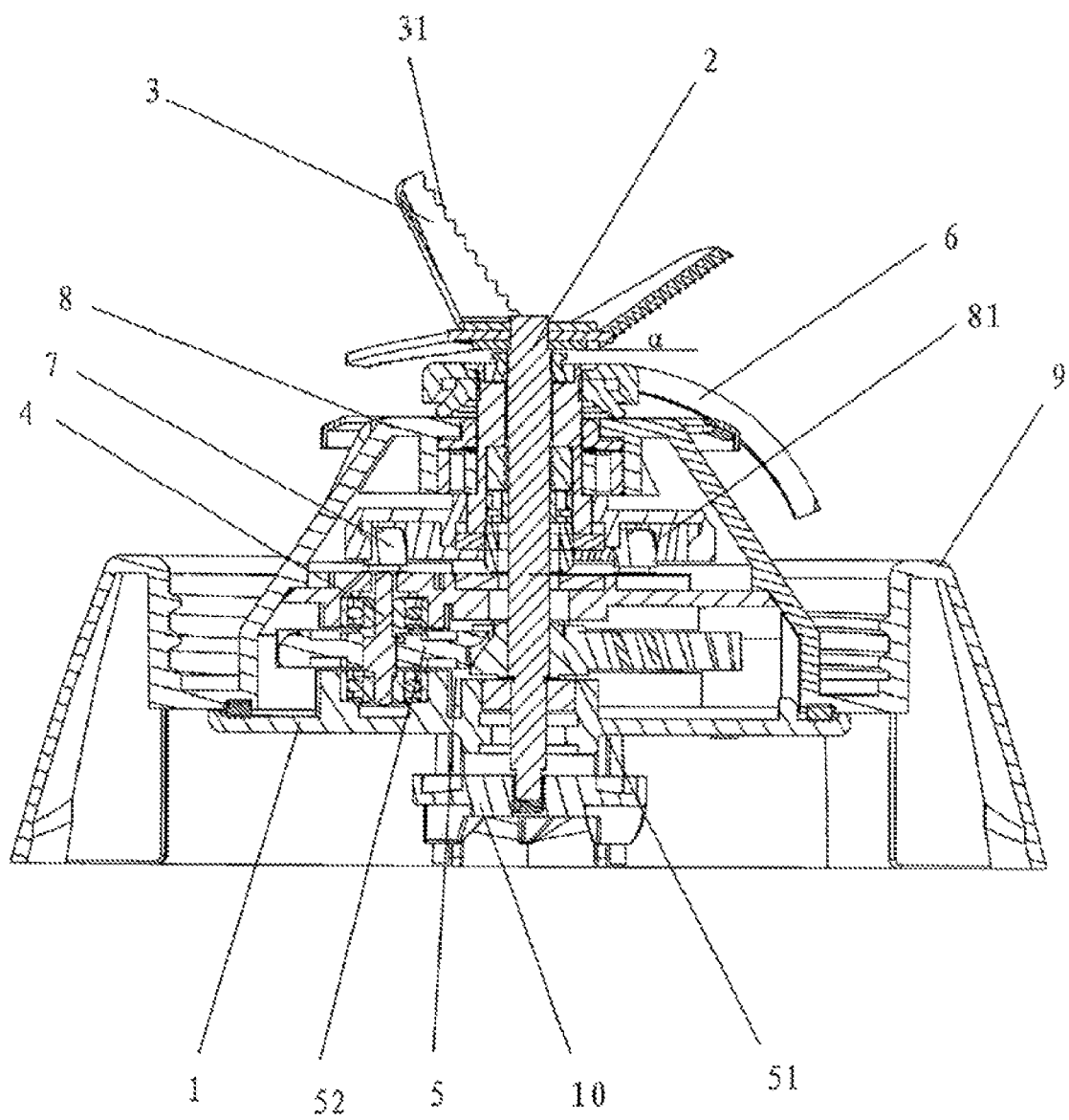
FIG. 3 is a cutaway view of the structure in FIG. 1.

In order to clearly describe the following embodiments, reference numbers in the accompanying drawings are illustrated as follows:

1. Axis base; 2. Main blade axis
3. Main tool; 31. Saw teeth
4. Assistant blade axis;
5. Gearing means; 51. Gear A; 52. Gear B
6. Assistant tool; 7. Gear C;
8. Assistant blade pan; 81. Inner teeth
9. Juicer seat; 10. Coupler; 11. Motor. 12. Cup of juicer

DETAILED DESCRIPTION OF THE PREFERRED EMBODIMENTS

Referring to FIG. 1 through FIG. 4, a cutting tool for juicer with two layers of blades is shown. One layer is a layer of main tool 3, and the other layer is a layer of assistant tool 6. The main tool 3 and the assistant tool 6 are arranged in an upper-lower position. The revolving direction of the main tool 3 is vis-a-vis with respect to that of the assistant tool 3. The speed of the assistant tool 6 is different and far lower than that of the main tool 3.

Specifically, the structure is that: the cutting tool comprises a seat of axis (1), on which mounted a main blade axis 2, a main tool 3 and an assistant blade axis 4 for driving the assistant tool 6. The main tool 3 is mounted on a top of the main blade axis 2. The main blade axis 2 drives the assistant blade axis 4 to rotate via a gear A 51 and a gear B 52 of a gearing means 5. The assistant blade axis 4 drives the assistant tool 6 to rotate. The revolving direction of the assistant tool 6 is vis-a-vis with respect to that of the main tool, and the speed of the assistant tool 6 is different from that of the main tool. The detailed structure of the gearing means 5 is that: the gear A 51 is provided at an underside of the main blade axis 2, and the gear B 52 is provided at an underside of the assistant blade axis 4. The gear A 51 and the gear B 52 engage with each other. A gear C 7 is provided at the top of the assistant blade axis 4. An assistant blade pan 8 having inner teeth 81 that extend inward is sheathed to the top of the main blade axis 2. The assistant tool 6 is mounted on an outboard surface of the assistant blade pan 8. The gear C 7 and the inner teeth 81 of the assistant blade pan 8 engage with each other. The main blade is a blade assembly composed of three groups of blades. The three blades, respectively, form three different angles .alpha. with respect to the round or square sheet with a center hole. At least one side of each main blade 3 defines saw teeth 31. The assistant tool 6 is in a long arc shape. In use, the whole cutting tool is mounted on a juicer seat 9. A coupler 10 is installed at the underside of the main blade axis so as to engage with a motor 11 (See FIG. 4).

Apparently, the main blade 3 could be designed to be a round sheet with a hole. At least three blades extend outward from an outer circumference of the round sheet. The blades have structure of bending upward to form varying angles α with respect to an extended plane of the round sheet.

Figure 6:
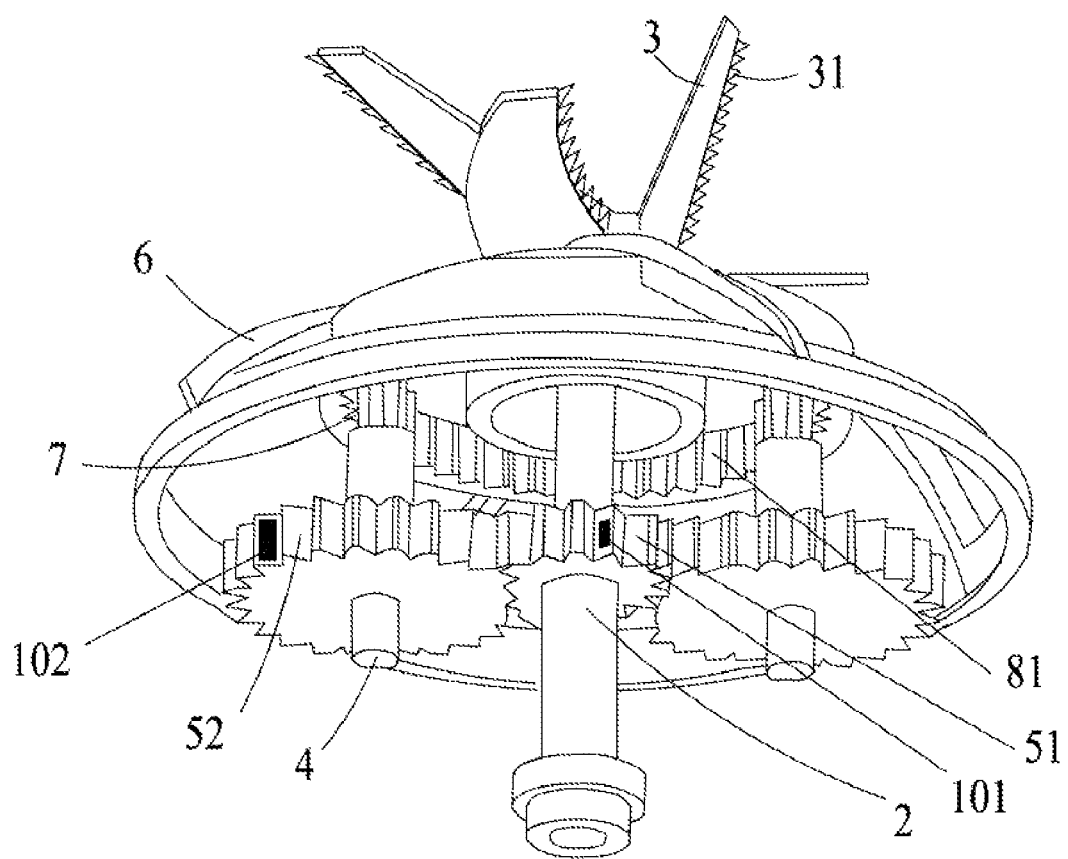
FIG. 6 is a perspective view of an embodiment of a gearing means with inlaid magnets.

As an improvement of the present invention, referring to FIG. 6, the gearing means 5 can also be designed as follows: a driving gear A 51 is provided at the underside of the main blade axis 2. A first magnet 101 is inlaid at an outer edge of the driving gear A 51. A driving gear B 52 is provided at the underside of the assistant blade axis. A second magnet 102 with an inverse polarity relative to the first magnet is inlaid at an outer edge of the driving gear B 52. The driving gear A 51 rotates vis-a-vis with respect to the driving gear B 52 through a magnetic force.

Figure 7:
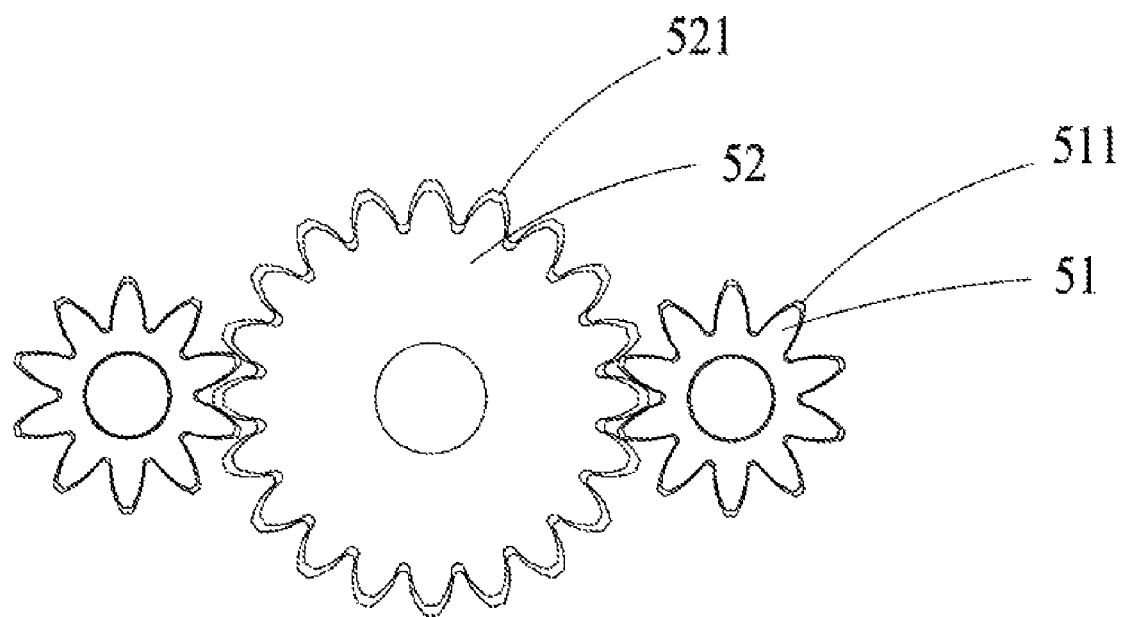
FIG. 7 is a schematic top view of a further embodiment of the gearing means with a rubber layer.

As another improvement of the gearing means 5, referring to FIG. 7, the structure of the gearing means 5 can also be designed as follows: the driving gear A 51 is provided at the underside of the main blade axis. A first rubber layer 511 is coated on an outer edge of the driving gear A 51. A driving gear B 52 is provided at the underside of the assistant blade axis. A second rubber layer 521 is coated on the outer edge of the driving gear B 52. The first rubber layer contacts the second rubber layer.

Figure 4:
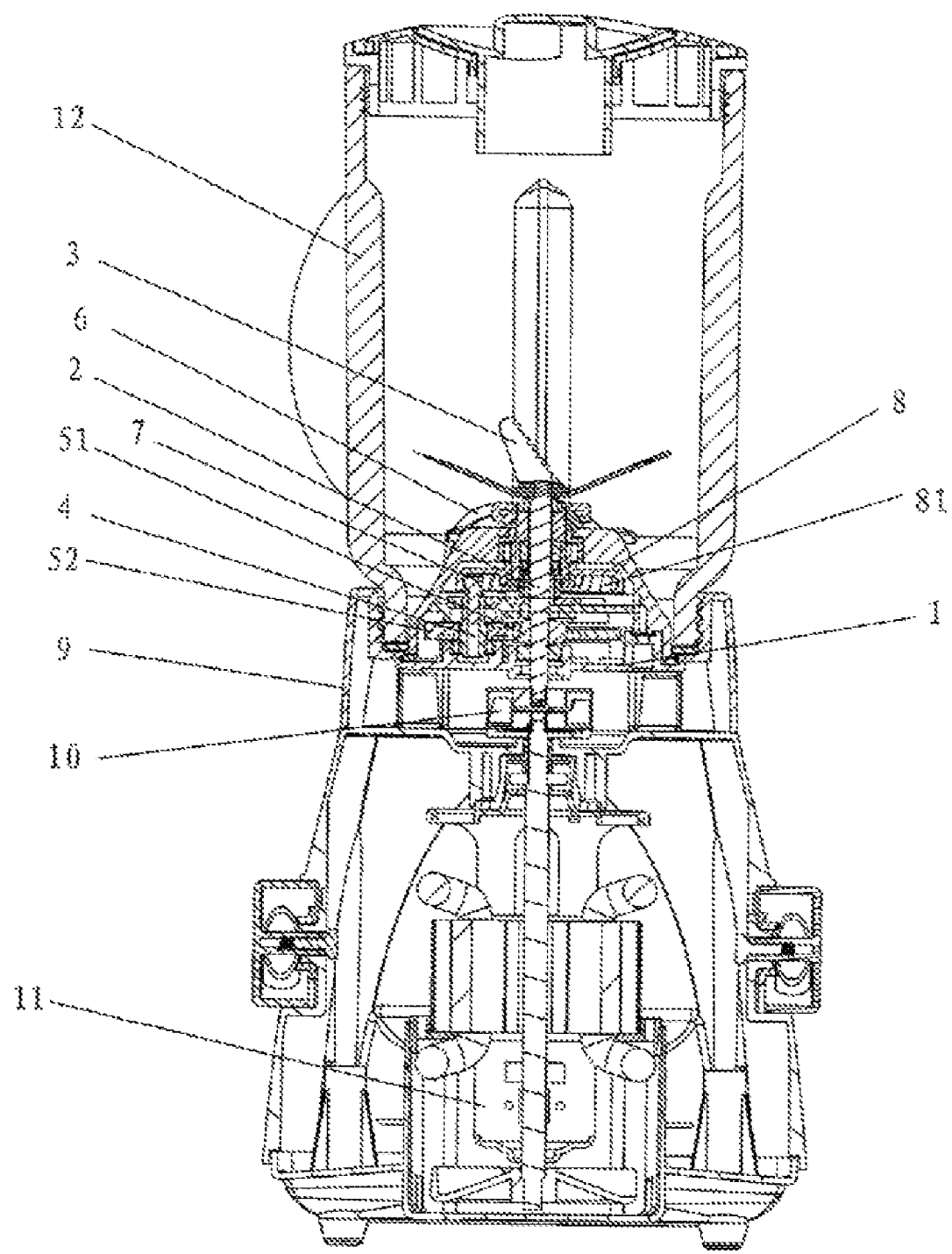
FIG. 4 is a schematic view of the embodiment shown in FIG. 1 in a use status.
Figure 5:
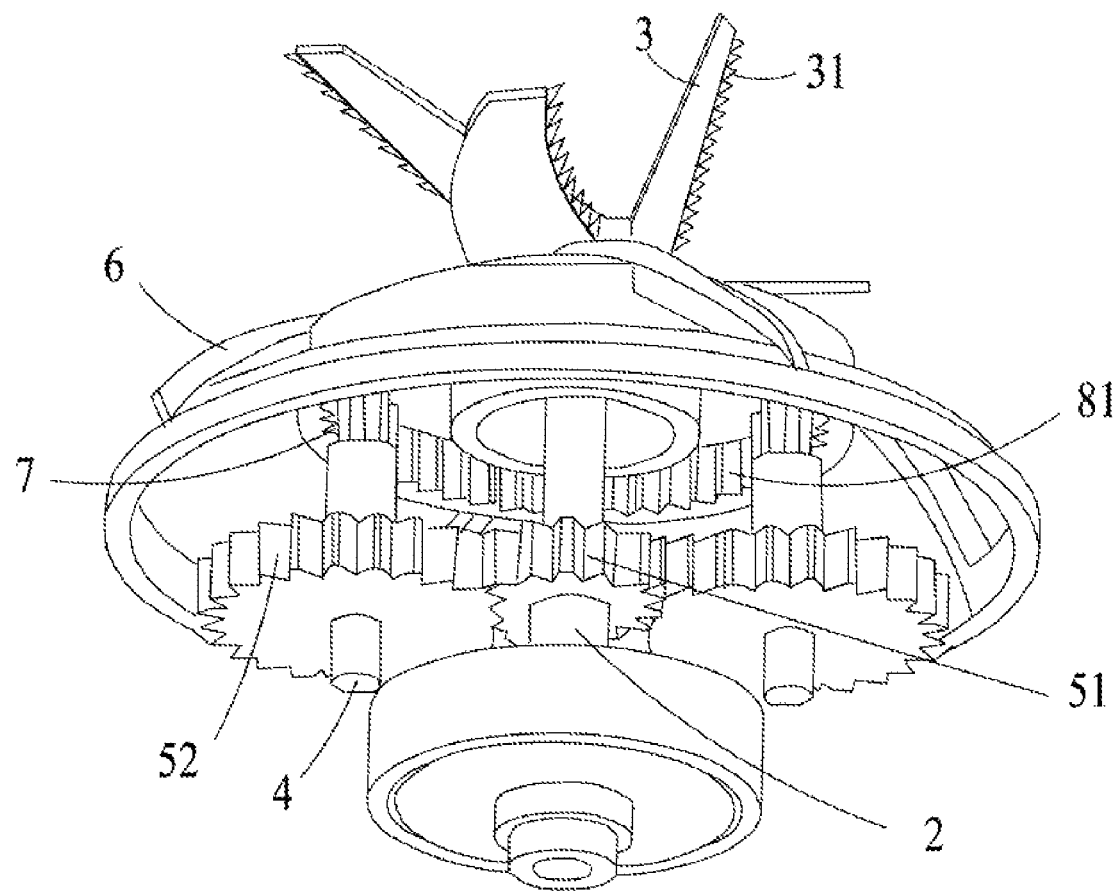
FIG. 5 is a perspective view of the partial structure of the embodiment in FIG. 3.

Referring to FIG. 4, FIG. 4 is a schematic view of the embodiment shown in FIG. 1 in a use status. It is shown that the entire cutting tool is mounted on the juicer seat 9. The motor 11 is coupled to the main blade axis of the cutting tool through the coupler 10. A juicer cup 12 is threadedly connected to the juicer seat 9. The main tool 3 and the assistant tool 6 are disposed at an underside of the juicer cup 12.

The invention claimed is:

1. A cutting tool for juicer, comprising:
a seat of axis;
a main blade axis and a main tool mounted on the top of the main blade axis, the main blade axis and the mail tool being mounted on the seat of axis;
an assistant tool and an assistant blade axis for driving the assistant tool, the assistant blade axis being mounted on the seat of axis; and
a gearing means including a first driving gear provided at an underside of the main blade axis, a second gear provided at an underside of the assistant blade axis, a first magnet being inlaid at an outer edge of the first driving gear, and a second magnet with an inverse polarity relative to the first magnet being inlaid at an outer edge of driving gear, the first driving gear and the second driving gear engaging with each other, and the first driving gear rotating the second driving gear in a vis-a-vis direction through magnetic force,
the main blade axis driving the assistant blade axis to rotate through the gearing means, the assistant blade axis rotating the assistant tool, the assistant tool rotating with vis-a-vis differential speed with respect to the main tool.

2. The cutting tool for juicer according to claim 1, wherein a first rubber layer is coated on the outer edge of the driving gear, a second rubber layer is coated on the outer edge of the second driving gear, the first rubber layer contacting the second rubber layer.

3. The cutting tool for juicer according to claim 1, wherein a gear C is provided at a top of the assistant blade axis, an assistant blade pan having inner teeth that extend inward being sheathed to a top of the main blade axis, the assistant tool being mounted on an outboard surface of the assistant blade pan, the gear C and the inner teeth of the assistant blade pan engaging with each other.

4. The cutting tool for juicer according to claim 1, wherein the main tool is a round sheet with a hole, at least three blades extending outward from an outer circumference of the round sheet, the blades bending upward to form angles α with respect to an extended plane of the round sheet.

5. The cutting tool for juicer according to claim 4, wherein the angles α between the blades and the extended plane of the round sheet vary.

6. The cutting tool for juicer according to claim 4, wherein at least one side of each said blade has saw teeth.

7. The cutting tool for juicer according to claim 1, wherein the assistant tool is in a long arc shape.

8. The cutting tool for juicer according to claim 1, wherein the main tool is arranged on an upper layer and the assistant tool is arranged under the main tool, the assistant tool running lower than the main tool.

\* \* \* \* \*